(12) United States Patent
Usami et al.

(10) Patent No.: US 6,682,662 B2
(45) Date of Patent: Jan. 27, 2004

(54) FLUORESCENT LAMP COVER AND LIGHTING FIXTURE

(75) Inventors: Takashi Usami, Tokyo (JP); Teruo Nagano, Tokyo (JP); Tadahisa Sato, Kanagawa (JP); Katsuyoshi Yamakawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 160 days.

(21) Appl. No.: 09/917,871

(22) Filed: Jul. 31, 2001

(65) Prior Publication Data

US 2002/0040976 A1 Apr. 11, 2002

(30) Foreign Application Priority Data

Jul. 31, 2000 (JP) ................................ P. 2000-231712

(51) Int. Cl.[7] .............................. C08K 5/00; F21V 9/06
(52) U.S. Cl. ......................... 252/301.35; 252/301.28; 362/317; 362/260; 362/230
(58) Field of Search ....................... 252/301.28, 301.35; 362/317, 268, 230; 428/640

(56) References Cited

U.S. PATENT DOCUMENTS 3,873,531 A * 3/1975 Elam .................. 546/116
3,926,969 A * 12/1975 Fleck et al. .............. 548/219
5,998,626 A * 12/1999 Sato ..................... 548/219

FOREIGN PATENT DOCUMENTS

| CH | 581 134 | 10/1976 |
|----|---------|---------|
| JP | 51-77639 | 7/1976 |
| JP | B-6-3682 | 1/1994 |
| JP | A-11-29556 | 2/1999 |

OTHER PUBLICATIONS

Patent Abstracts of Japan—11 029 556 (2/99).
European Search Report dated Dec. 19, 2001.

* cited by examiner

Primary Examiner—C. Melissa Koslow
(74) Attorney, Agent, or Firm—Sughrue Mion, PLLC

(57) ABSTRACT

A fluorescent lamp cover which comprises a transparent resin containing a fluorescent brightening agent so as to cut off 90% or more of the rays of 410 nm or less, wherein the fluorescent brightening agent is represented by the following formula (I):

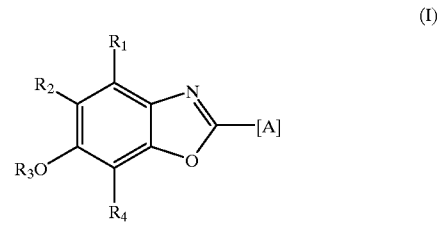

wherein $R_1$ and $R_4$ each represents a hydrogen atom, an alkyl group or an alkoxyl group; $R_2$ and $R_3$ each represents an alkyl group; and [A] represents a substituted aryl or substituted ethenyl group.

4 Claims, 2 Drawing Sheets

FLUORESCENT LAMP COVER AND LIGHTING FIXTURE

FIELD OF THE INVENTION

The present invention relates to an ultraviolet-absorbing cover for a fluorescent lamp for cutting harmful ultraviolet rays generated from a lighting fixture, e.g., a fluorescent lamp, which causes luring flying insects, and relates to a lighting fixture equipped with the same.

Further, the present invention relates to a film to be covered on a windowpane for cutting harmful ultraviolet ray of sunrays and ultraviolet rays generated from a lighting fixture, e.g., a fluorescent lamp, which causes luring flying insects, and also relates to an ultraviolet-absorbing film for preventing discoloration of photographs and liquid crystal displays by cutting ultraviolet ray of sunrays and a fluorescent lamp.

BACKGROUND OF THE INVENTION

For the purpose of interrupting ultraviolet ray of sunrays harmful to the human body and ultraviolet rays generated from fluorescent lamps which cause luring flying insects, paints containing ultraviolet absorbers and fluorescent lamps provided with heat-shrinkable films are on the market and are also suggested in JP-A-8-111208, JP-A-10-21714 and JP-A-11-106666 (the term "JP-A" as used herein means an "unexamined published Japanese patent application"). However, absorption edge of those ultraviolet absorbers is shorter than 380 nm for the purpose of suppressing a yellow tint, or they are capable of absorbing ultraviolet rays to a long wavelength of 410 nm but accompanied by a strong yellow tint, or dyes and pigments are added for adjusting the tone of color for suppressing a tint of yellow. That absorption edge is short means UV-cutting off performance is low, and in particular, three-wavelength type fluorescent lamps, which are expected to spread prevailingly, have not absorption at 380 nm or less, or little if any. Accordingly, since the performance of preventing flying insects of three-wavelength fluorescent lamps themselves is expected, there is no necessity for such contrivances. However, since there remains emission in the vicinity of 405 nm even with three-wavelength type fluorescent lamps, as is apparent from the phototaxis curve of insects (insects generally strongly react to the wavelengths near the ultraviolet region, and this wavelength dependence is graphed) as disclosed in JP-A-7-3189, it is necessary to interrupt the emission line in the vicinity of 405 nm for the purpose of effectively preventing flying insects, therefore it is desired to cut off the rays to 410 nm. The interruption of the rays to 410 nm is accompanied by a tint of yellow. A tint of yellow can be suppressed by the addition of dyes and pigments but this countermeasure results in the sacrifice of transmittance in the visible ray region.

Further, white lamination polyester films mixed with a fluorescent brightening agent as well as an ultraviolet absorber for the purpose of suppressing the yellowing degree due to ultraviolet irradiation which are excellent in light fastness, whitening property and adhesive property are suggested (JP-A-11-291432 and JP-A-11-26821), but the same drawbacks as above still remain unsolved.

Further, as an ultraviolet-cutting off cover for a fluorescent lamp, composition comprising a transparent resin containing a fluorescent brightening agent is suggested (JP-B-6-3682, (the term "JP-B" as used herein means an "examined Japanese patent publication")), but there is a problem in this technique that the fluorescent brightening agent is deteriorated and causes yellowing.

SUMMARY OF THE INVENTION

The present invention has been developed for solving the above-described problems.

Accordingly, an object of the present invention is to provide an exchangeable fluorescent lamp cover, which does not generate a yellow tint even by cutting the rays up to 410 nm longer than 380 nm by the addition of a fluorescent brightening agent emitting blue fluorescence which is a complementary color to yellow, which cover is highly transparent and having longer light fastness than the duration of a fluorescent lamp.

Other objects of the present invention is to provide a high transparent film to be covered on a windowpane which generates no yellow tint even by cutting the rays longer than 405 nm, in particular, the rays up to 410 nm longer than 380 nm by the addition of a fluorescent brightening agent emitting blue fluorescence which is a complementary color to yellow, and to provide a film for preventing discoloration of photographs and liquid crystal displays by cutting ultraviolet rays of sunrays and from a fluorescent lamp.

The objects of the present invention to provide an ultraviolet-cutting off cover for a fluorescent lamp comprising a thermoplastic resin containing a fluorescent brightening agent and a lighting fixture equipped with the same have been accomplished by the following means.

(1) A fluorescent lamp cover which comprises a transparent resin containing a fluorescent brightening agent so as to cut off 90% or more of the rays of 410 nm or less, wherein the fluorescent brightening agent is represented by the following formula (I):

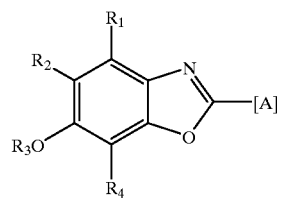

wherein $R_1$ and $R_4$ each independently represents a hydrogen atom, an alkyl group or an alkoxyl group; $R_2$ and $R_3$ each independently represents an alkyl group; and [A] represents a substituted aryl or substituted ethenyl group.

(2) The fluorescent lamp cover as described in the above item (1), wherein the compound represented by formula (I) is a compound represented by the following formula (II):

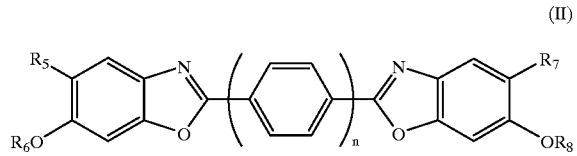

wherein $R_5$ and $R_7$ have the same meaning as $R_2$; $R_6$ and $R_8$ have the same meaning as $R_3$; and n represents an integer of 1 or 2.

(3) The fluorescent lamp cover as described in the above item (1) or (2), wherein the transparent resin is a copolymer of from 1/99 mass % to 99/1 mass % of methyl methacrylate/styrene.

(4) A lighting fixture which comprises a broadband emission type or three-wavelength emission type fluorescent lamp covered with the cover as described in the above item (1), (2) or (3) so as to cut off the rays of 410 nm or less.

Further objects of the present invention to provide an ultraviolet ray-cutting off film containing a fluorescent brightening agent to be covered on a windowpane, and a film for preventing discoloration of photographs by cutting ultraviolet rays of sunrays and from a fluorescent lamp have been accomplished by the following means.

(5) An ultraviolet-absorbing film containing a fluorescent brightening agent and having a transmittance of the rays of 410 nm or less of 90% or less, wherein the fluorescent brightening agent is represented by the following formula (I):

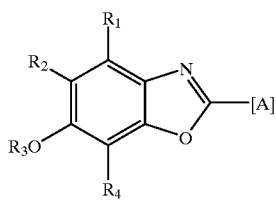

wherein $R_1$ and $R_4$ each independently represents a hydrogen atom, an alkyl group or an alkoxyl group; $R_2$ and $R_3$ each independently represents an alkyl group; and [A] represents a substituted aryl or substituted ethenyl group.

(6) The ultraviolet-absorbing film as described in the above item (5), wherein an ultraviolet absorber is further contained.

(7) The ultraviolet-absorbing film as described in the above item (5) or (6), which comprises a transparent support, an adhesive layer and a mold releasing paper.

DETAILED DESCRIPTION OF THE INVENTION

Figure 1:
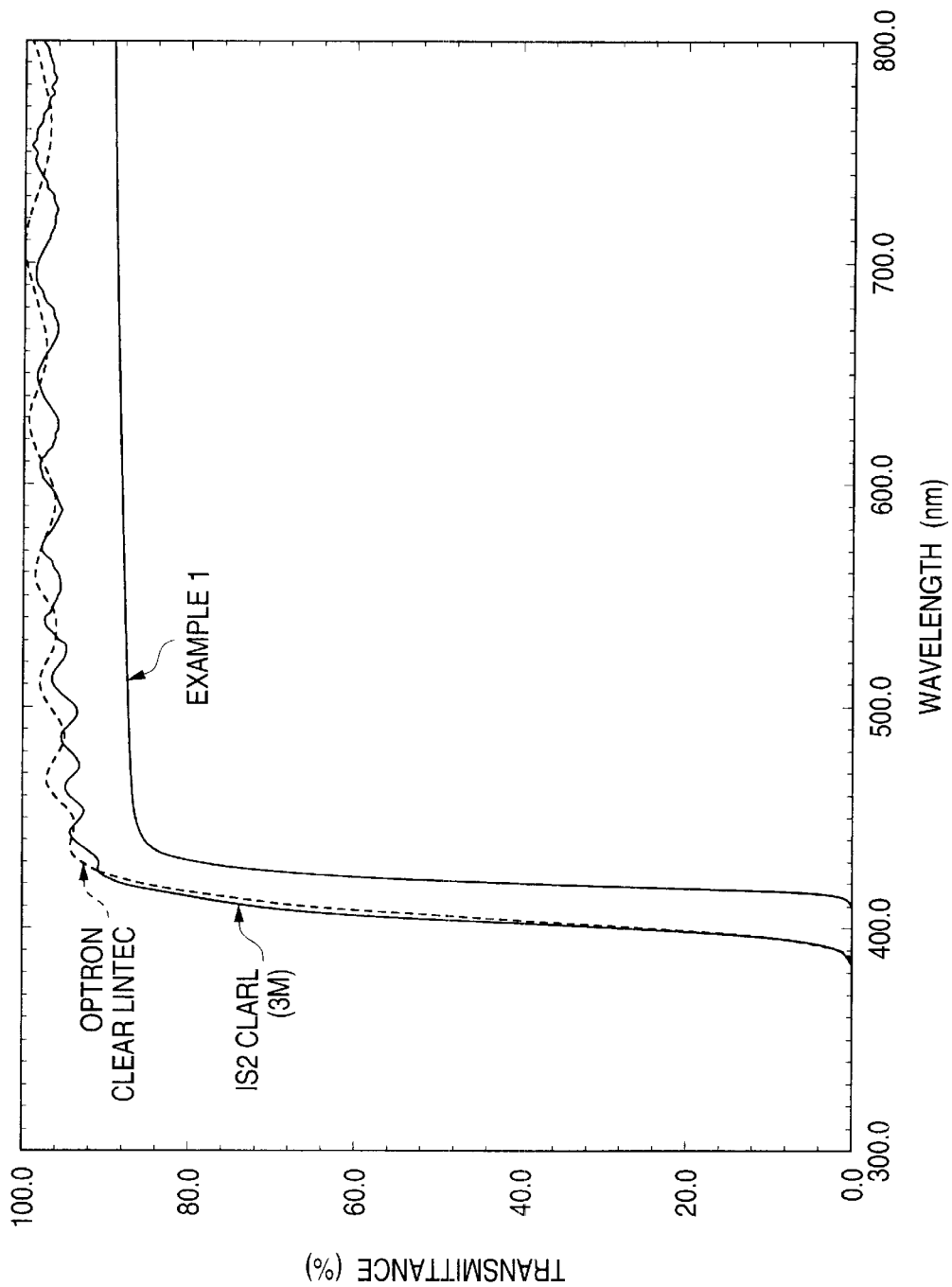
FIG. 1 is a graph showing the absorption spectra of ultraviolet rays in Example 1 of the present invention and commercially available products.

In general, fluorescent brightening agents comprise compounds having the properties of absorbing the rays of the wavelength of from about 320 to about 410 nm and emitting the rays of the wavelength of from about 410 to about 500 nm. When a fabric is dyed with these fluorescent brightening agents, since blue light of the wavelength of from about 410 to about 500 nm emitted from the fluorescent brightening agents is newly added to the fabric in addition to the original yellowish reflected light, the reflected light becomes white and the energy of visible rays is increased for the fluorescent effect, as a result the fabric is brightened.

It is disclosed in JP-B-6-3682 that with a molded product of a thermoplastic resin to which an ultraviolet absorber is added, when the addition amount of the ultraviolet absorber is adjusted so as to cut off the ultraviolet rays of 410 nm or less, in particular 405 nm or less, the yellow tint of the reflected light looks deep, but when an appropriate amount of a fluorescent brightening agent is added in place of or in addition to the ultraviolet absorber, the reflected light is whitened. The present inventors have found that the light fastness is remarkably improved by using the compound represented by formula (I) as the fluorescent brightening agent, thus the present invention has been attained.

The cover for a fluorescent lamp is described in the first place.

As the polycondensation resin components for use in the transparent resins, polyurethane, polyester, polyamide, polyurea and polycarbonate can be exemplified. The specific examples of them are shown below in the form of starting material monomers.

However, P-23 and on and after P-34 are shown as the form of polymers, but the present invention is not limited to these compounds. The acidic group in each polymer is represented in non-dissociation form. The constituting components of the polymers formed by condensation reaction, e.g., polyester, polyamide, etc., are all expressed as dicarboxylic acid, diol, diamine, hydroxycarboxylic acid, aminocarboxylic acid, etc., irrespective of the starting materials. The ratios shown in parentheses means mol %.

| | |
|---|---|
| P-1 | Toluenediisocyanate/ethylene glycol/1,4-butanediol (50/15/35) |
| P-2 | 4,4'-Diphenylmethanediisocyanate/1,3-propanediol/polypropylene glycol (MW: 1,000) (50/45/5) |
| P-3 | Toluenediisocyanate/hexamethylenediisocyanate/ethylene glycol/polyethylene glycol (MW: 600)/1,4-butanediol (40/10/20/10/20) |
| P-4 | 1,5-Naphthylenediisocyanate/hexamethylenediisocyanate/diethylene gllycol/1,6-hexanediol (25/25/35/15) |
| P-5 | 4,4'-Diphenylmethanediisocyanate/hexamethylenediisocyanate/tetraethylene glycol/ethylene glycol/2,2-bus(hydroxymethyl)propionic acid (40/10/20/20/10) |
| P-6 | 4,4'-Diphenylmethanediisocyanate/hexamethylene diisocyanate/butanediol/ethylene glycol/2,2-bis-(hydroxymethyl)propionic acid (40/10/20/20/10) |
| P-7 | 1,5-NaphthylenediisoCyanate/butanediol/4,4'-dihydroxy-diphenyl-2,2'-propane/polypropylene glycol (Mw: 400) /2,2-bis(hydroxymethyl)propionic acid (50/20/5/10/15) |
| P-8 | 1,5-Naphthylenediisocyanate/hexamethylenediisocyanate/2,2-bis(hydroxymethyl)butanoic acid/polybutylene oxide (MW: 500) (35/15/25/25) |
| P-9 | Isophoronediisocyanate/diethylene glycol/neopentyl glycol/2,2-bis(hydroxymethyl)propionic acid (50/20/20/10) |
| P-10 | Toluenediisocyanate/2,2-bis(hydroxymethyl)butanoic acid/polyethylene glycol (Mw: 1,000)/cyclohexanedimethanol (50/10/10/30) |
| P-11 | Diphenylmethanediisocyanate/hexamethylenediisocyanate/tetraethylene glycol/butanediol/2,4-di(2-hydroxy) ethyloxycarbonylbenzenesulfonic acid (40/10/10/33/7) |
| P-12 | Diphenylmethanediisocyanate/hexamethylenediisocyanate/butanediol/ethylene glycol/2,2-bis-(hydroxymethyl)butanoic acid/2,4-di(2-hydroxy)-ethyloxycarbonylbenzenesulfonic acid (40/10/20/15/10/5) |
| P-13 | Terephthalic acid/isophthalic acid/cyclohexanedimethanol/1,4-butanediol/ethylene glycol (25/25/25/15/10) |
| P-14 | Terephthalic acid/isophthalic acid/4,4'-dihydroxy-diphenyl-2,2-propane/tetraethylene glycol/ethylene glycol (30/20/20/15/15) |
| P-15 | Terephthalic acid/isophthalic acid/cyclohexanedimethanol/neopentyl glycol/diethylene glycol (20/30/25/15/10) |
| P-16 | Terephthalic acid/isophthalic acid/4,4'-benzene dimethanol/diethylene glycol/neopentyl glycol (25/25/25/15/10) |

-continued

| | |
|---|---|
| P-17 | Terephthalic acid/isophthalic acid/5-sulfoisophthalic acid/ethylene glycol/neopentyl glycol (24/24/2/25/25) |
| P-18 | Terephthalic acid/isophthalic acid/5-sulfoisophthalic acid/cyclohexanedimethanol/1,4-butanediol/ethylene glycol (22/22/6/25/15/10) |
| P-19 | Isophthalic acid/5-sulfoisophthalic acid/cyclohexanedimethanol/ethylene glycol (40/10/40/10) |
| P-20 | Cyclohexanedicarboxylic acid/isophthalic acid/2,4-di(2-hydroxy)ethyloxycarbonylbenzenesulfonic acid/cyclohexanedimethanol/ethylene glycol (30/20/5/25/20) |
| P-21 | 11-Aminoundecanoic acid (100) |
| P-22 | 12-Aminododecanoic acid (100) |
| P-23 | Reaction product of poly(12-aminododecanoic acid) and maleic anhydride (50/50) |
| P-24 | 11-Aminoundecanoic acid/7-aminoheptanoic acid (50/50) |
| P-25 | Hexamethylenediamine/adipic acid (50/50) |
| P-26 | Tetramethylenediamine/adipic acid (50/50) |
| P-27 | Hexamethylenediamine/sebacic acid (50/50) |
| P-28 | N,N-Dimethylethylenediamine/adipic acid/cyclohexanedicarboxylic acid (50/20/30) |
| P-29 | Toluenediisocyanate/4,4'-diphenylmethanediisocyanate/hexamethylenediamine (30/20/50) |
| P-30 | Nonamethylenediamine/Urea (50/50) |
| P-31 | Hexamethylenediamine/nonmethylenediamine/urea (25/25/50) |
| P-32 | Toluenediisocyanate/hexamethylenediamine/2,2-bis-(hydroxymethyl)propionic acid (50/40/10) |
| P-33 | 11-Aminoundecanoic acid/hexamethylenediamine/Urea (33/33/33) |

The examples of the monomers which constitute the vinyl polymers of the present invention include acrylic esters, specifically, e.g., methyl acrylate, ethyl acrylate, n-propyl acrylate, isopropyl acrylate, n-butyl acrylate, isobutyl acrylate, sec-butyl acrylate, tert-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2-methoxyethyl acrylate, 3-methoxybutyl acrylate, 2-ethoxybutyl acrylate, 2-ethoxyethyl acrylate, 2-isopropoxy acrylate, 2-butoxyethyl acrylate, 2-(2-methoxyethoxy)ethyl acrylate, 2-(2-methoxyethoxy)ethyl acrylate, 2-(2-butoxyethoxy) ethyl acrylate, ω-methoxypolyethylene glycol acrylate (addition mol number: 9), 1-bromo-2-methoxyethyl acrylate, and 1,1-dichloro-2-ethoxyethyl acrylate. In addition, the following monomers can be used.

Methacrylic esters, specifically, e.g., methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, sulfopropyl methacrylate, N-ethyl-N-phenylaminoethyl methacrylate, 2-(3-phenylpropyloxy)ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-acetoxyethyl methacrylate, 2-acetoacetoxyethyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy) ethyl methacrylate, ω-methoxypolyethylene glycol methacrylate (addition mol number: 6), acryl methacrylate, and methacrylic acid dimethylaminoethylmethyl chloride salt can be exemplified.

Vinylesters, specifically, e.g., vinylacetate, vinyl propionate, vinyl butyrate, vinyl isobutyrate, vinyl caproate, vinyl chloroacetate, vinylmethoxy acetate, vinylphenyl acetate, vinyl benzoate and vinyl salicylate can be exemplified.

Acrylamides, e.g., acrylamide, methylacrylamide, ethylacrylamide, propylacrylamide, isopropylacrylamide, n-butylacrylamide, sec-butylacrylamide, tert-butylacrylamide, cyclohexylacrylamide, benzylacrylamide, hydroxymethylacrylamide, methoxyethylacrylamide, dimethylaminoethylacrylamide, phenylacrylamide, dimethylacrylamide, diethylacrylamide, β-cyanoethylacrylamide, N-(2-acetoacetoxyethyl) acrylamide, and diacetoneacrylamide can be exemplified.

Methacrylamides, e.g., methacrylamide, methylmethacrylamide, ethylmethacrylamide, propylmethacrylamide, isopropylmethacrylamide, n-butylmethacrylamide, sec-butylmethacrylamide, tert-butylmethacrylamide, cyclohexylmethacrylamide, benzylmethacrylamide, hydroxymethacrylamide, chlorobenzylmethacrylamide, octylmethacrylamide, stearylmethacrylamide, sulfopropylmethacrylamide, N-ethyl-N-phenylaminoethylmethacrylamide, 2-(3-phenylpropyloxy)ethylmethacrylamide, dimethylaminophenoxyethylmethacrylamide, furfurylmethacrylamide, tetrahydrofurfurylmethacrylamide, phenylmethacrylamide, cresylmethacrylamide, naphthylmethacrylamide, 2-hydroxyethylmethacrylamide, 4-hydroxybutylmethacrylamide, triethylene glycol monomethacrylamide, dipropylene glycol monomethacrylamide, 2-methoxyethylmethacrylamide, 3-methoxybutylmethacrylamide, 2-acetoxyethylmethacrylamide, 2-acetoacetoxyethylmethacrylamide, 2-ethoxyethylmethacrylamide, 2-isopropoxyethylmethacrylamide, 2-butoxyethylmethacrylamide, 2-(2-methoxyethoxy) ethylmethacrylamide, 2-(2-ethoxyethoxy) ethylmethacrylamide, 2-(2-butoxyethoxy) ethylmethacrylamide, ω-methoxypolyethylene glycol methacrylamide (addition mol number: 6), acrylmethacrylamide, dimethylaminomethacrylamide, diethylaminomethacrylamide, β-cyanoethylmethacrylamide, and N-(2-acetoacetoxyethyl) methacrylamide can be exemplified.

Olefins, e.g., dicyclopentadiene, ethylene, propylene, 1-butene, 1-pentene, vinyl chloride, vinylidene chloride, isoprene, chloroprene, butadiene, and 2,3-dimethylbutadiene can be exemplified.

Styrenes, e.g., styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, and vinylbenzoic acid methyl ester can be exemplified.

Vinyl ethers, e.g., methylvinyl ether, butylvinyl ether, hexylvinyl ether, methoxyethylvinyl ether and dimethylaminoethylvinyl ether can be exemplified.

As other examples, e.g., butyl crotonate, hexyl crotonate, dibutyl itaconate, dimethyl maleate, dibutyl maleate, dimethyl fumarate, dibutyl fumarate, methyl vinyl ketone, phenyl vinyl ketone, methoxyethyl vinyl ketone, glycidyl acrylate, glycidyl methacrylate, N-vinyloxazolidone, N-vinylpyrrolidone, acrylonitrile, methacrylonitrile, methylene moronnitrile, and vinylidene can be exemplified.

Two or more monomers of the monomers for use in the polycondensation products and polymers of the present invention may be used as comonomers with each other according to purposes (e.g., improvement of hardness, flexibility, tensile strength and light fastness).

The monomers in the polymers of the present invention are preferably methacrylate-based, acrylamide-based, methacrylamide-based, and styrene-based monomers.

The fluorescent brightening agents for use in the fluorescent lamp cover and ultraviolet-absorbing film according to the present invention can be selected from the following novel substances on the basis of light fastness, etc.

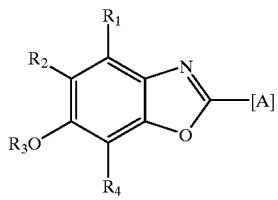
(I)

wherein $R_1$ and $R_4$ each represents a hydrogen atom, an alkyl group or an alkoxyl group; $R_2$ and $R_3$ each represents an alkyl group; and [A] represents a substituted aryl or substituted ethenyl group.

$R_1$, $R_2$, $R_3$, $R_4$ and [A] in formula (I) are described in detail below. $R_1$ and $R_4$ each represents a hydrogen atom, an alkyl group or an alkoxyl group, specifically a hydrogen atom, an alkyl group having from 1 to 8 carbon atoms, or an alkoxyl group having from 1 to 8 carbon atoms.

More specifically, $R_1$ and $R_4$ each represents a hydrogen atom, an alkyl group (e.g., methyl, ethyl, n-propyl, n-butyl, n-octyl, isopropyl, isobutyl, 2-ethylhexyl, t-butyl, t-amyl, t-octyl, cyclopentyl, cyclohexyl), or an alkoxyl group (e.g., methoxy, ethoxy, n-propoxy, n-butoxy, n-octyloxy, isopropoxy, isobutoxy, 2-ethylhexyloxy, t-butoxy, cyclohexyloxy). $R_1$ and $R_4$ each preferably represents a hydrogen atom or an alkyl group, particularly preferably represents a hydrogen atom.

$R_2$ and $R_3$ each represents an alkyl group, specifically an alkyl group having from 1 to 16 carbon atoms, more specifically represents an alkyl group, e.g., methyl, ethyl, n-propyl, n-butyl, n-octyl, n-hexadecanyl (cetyl), isopropyl, isobutyl, 2-ethylhexyl, t-butyl, t-amyl, t-octyl, cyclopentyl or cyclohexyl. Preferably $R_2$ represents methyl, isopropyl, t-butyl or cyclohexyl, and $R_3$ represents methyl, ethyl, n-propyl, n-butyl, n-pentyl, n-hexyl or 2-ethylhexyl. Particularly preferably $R_2$ represents t-butyl or cyclohexyl, and $R_3$ represents methyl, n-butyl, n-octyl or 2-ethylhexyl.

[A] represents a substituted aryl or substituted ethenyl group, specifically a substituted aryl group having from 6 to 40 carbon atoms or a substituted ethenyl group having from 8 to 40 carbon atoms. [A] preferably represents the substituted aryl or substituted ethenyl group shown below.

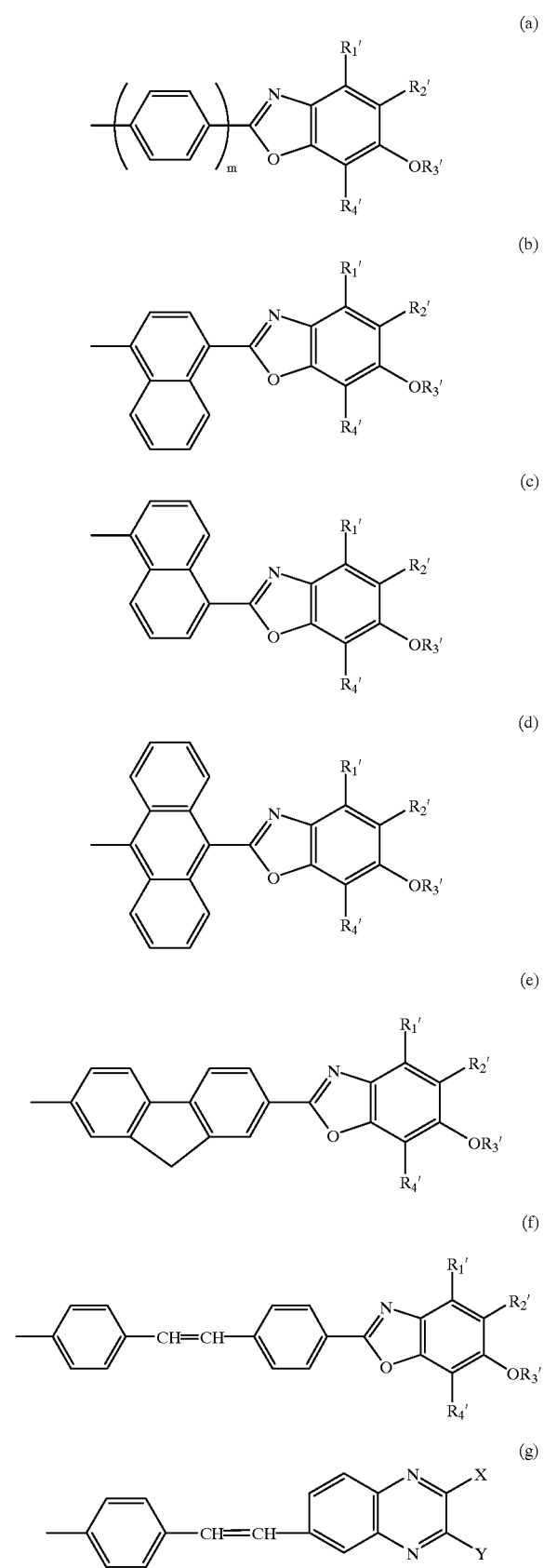

(h)

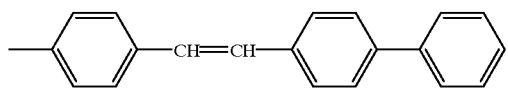

(i)

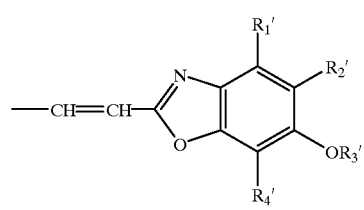

(j)

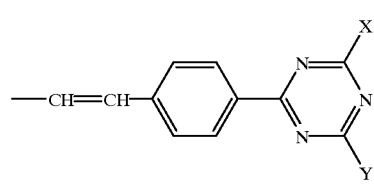

(k)

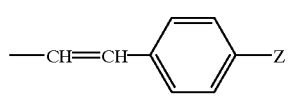

In the above formulae, $R_1'$ and $R_4'$ have the same meaning as $R_1$ and $R_4$ respectively. $R_2'$ and $R_3'$ have the same meaning as $R_2$ and $R_3$ respectively. m represents an integer of from 1 to 5. X and Y each represents an alkyl group, an aryl group, an alkoxyl group, an alkylamino group, an arylamino group, an amino group or a hydroxyl group. Z represents a substituent. To describe the groups other than an amino group and a hydroxyl group represented by X and Y in detail, an alkyl group, e.g., methyl, ethyl, isopropyl, t-butyl or cyclohexyl, an aryl group, e.g., phenyl, tolyl or naphthyl, an alkoxyl group, e.g., methoxy, ethoxy or isopropoxy, an alkylamino group, e.g., amino, aminomethyl, ethylamino, octylamino, dimethylamino or N-methyl-N-ethylamino, and an arylamino group, e.g., anilino, 4-tolylamino or N-methylanilino. X and Y each preferably represents an aryl, alkoxyl or anilino group. Examples of the substituent of Z include an alkyl group, an aryl group, a cyano group, and an alkoxycarbonyl group.

The compound represented by formula (I) is preferably a compound represented by the following formula (II):

(II)

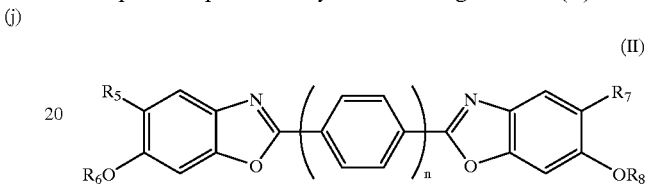

wherein $R_5$ and $R_7$ have the same meaning as $R_2$; $R_6$ and $R_8$ have the same meaning as $R_3$; and n represents an integer of 1 or 2.

These compounds can be synthesized according to the methods disclosed in JP-A-11-29556.

The specific examples of the fluorescent brightening agents represented by formula (I) or (II) for use in the present invention are shown below, but the present invention is not limited to these compounds.

(1)

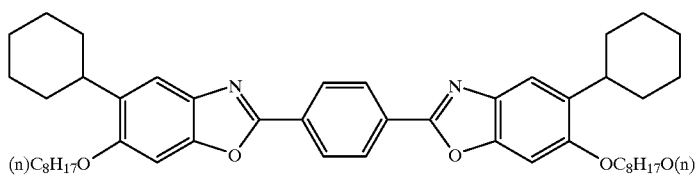

(2)

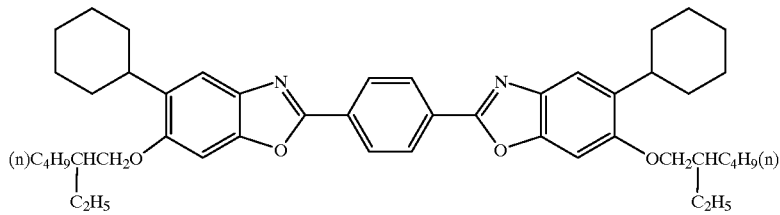

(3)

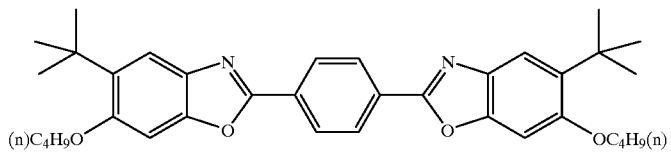

(4)

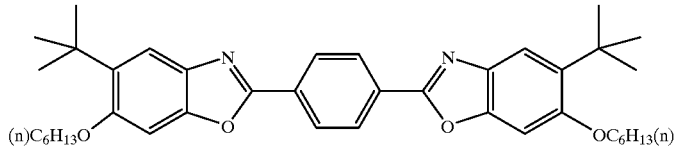

-continued
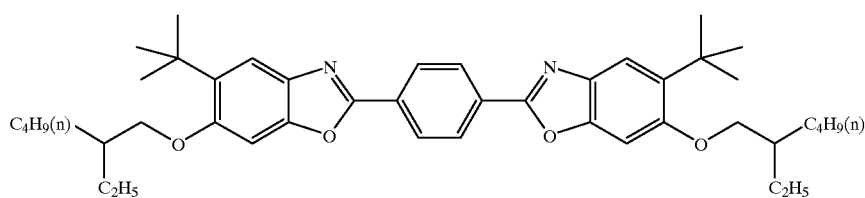
(5)
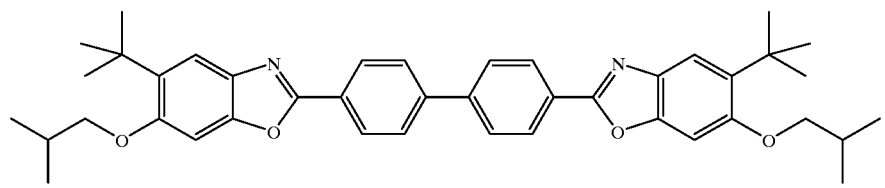
(6)
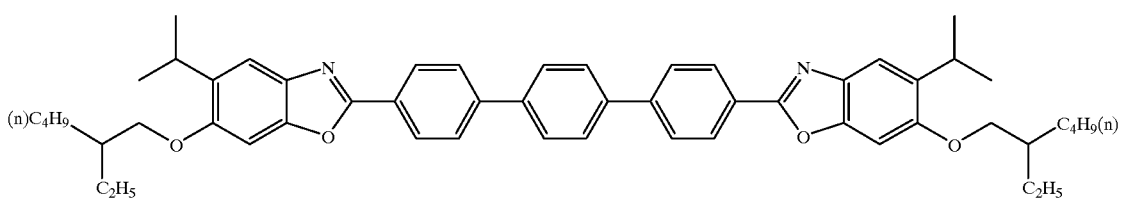
(7)
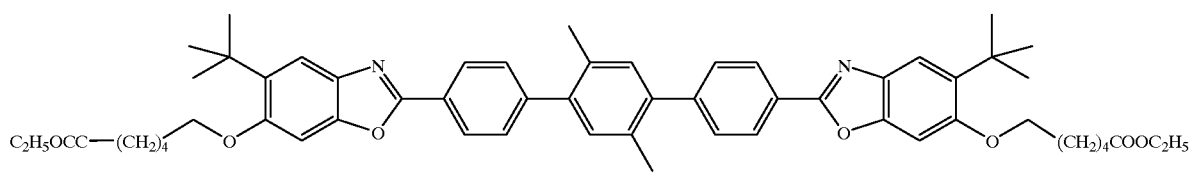
(8)
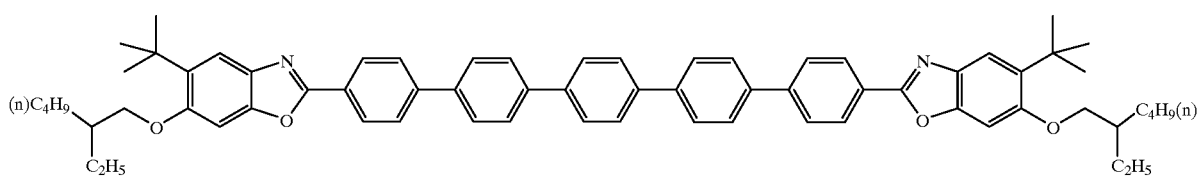
(9)
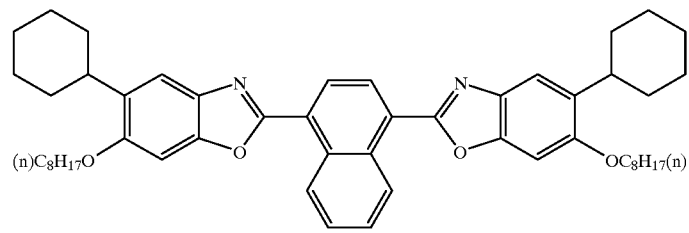
(10)
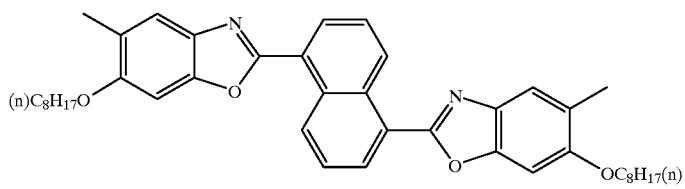
(11)

-continued
(12)
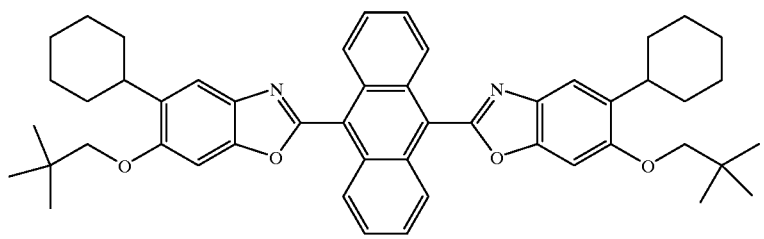
(13)
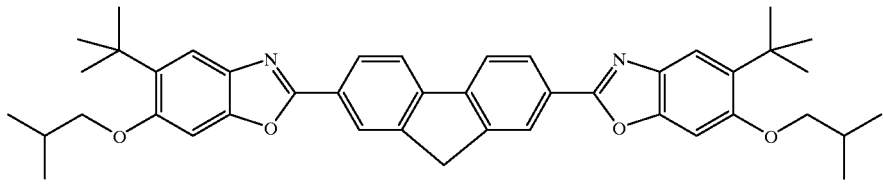
(14)
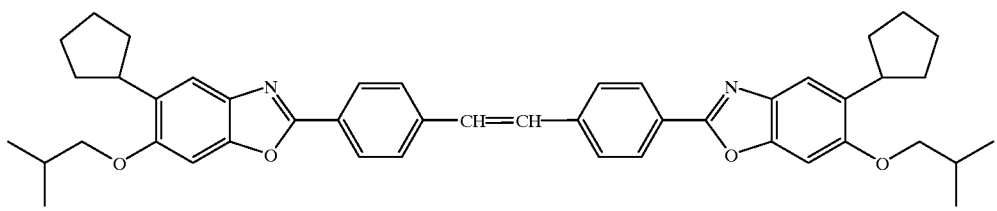
(15)
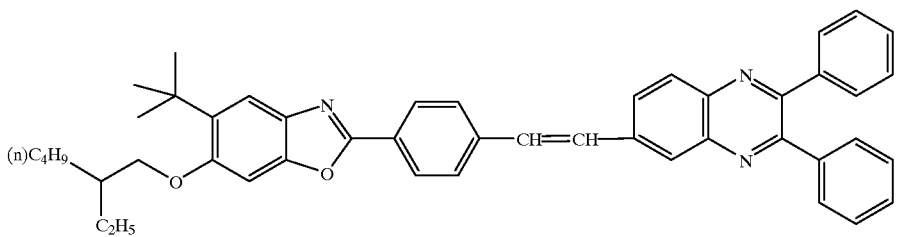
(16)
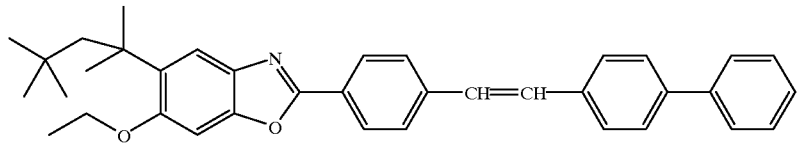
(17)
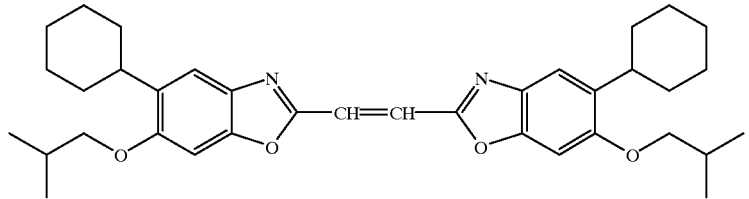
(18)
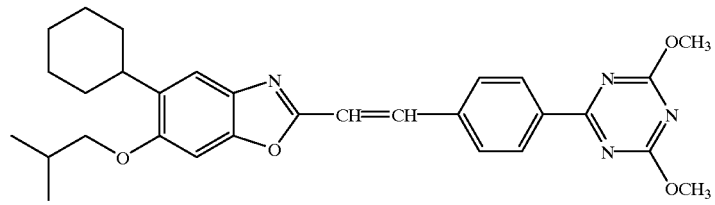

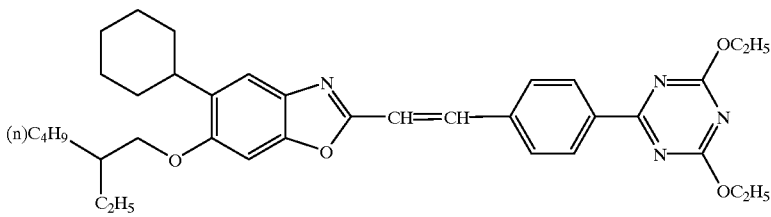

(19)

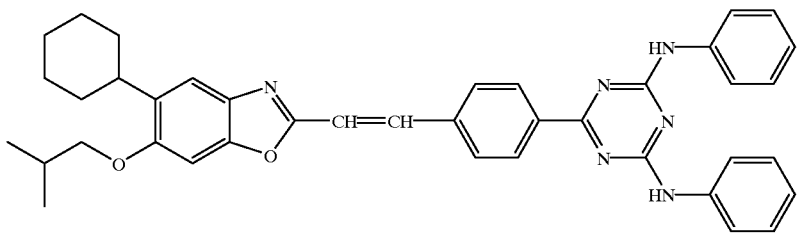

(20)

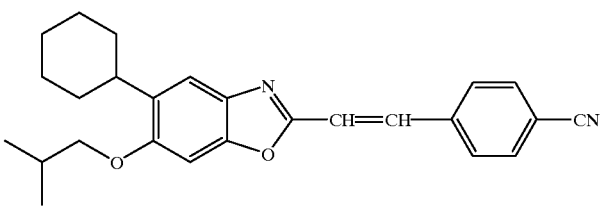

(21)

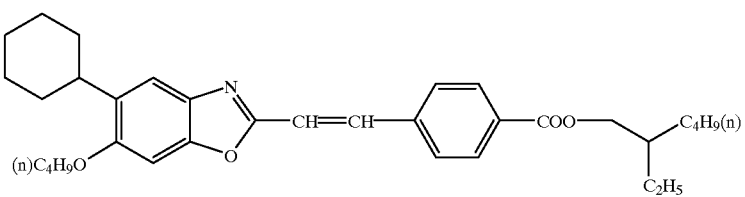

(22)

The above examples are organic compounds but the present invention is not limited to organic compounds and inorganic compounds can also be used.

These fluorescent brightening agents can be used alone or in combination of two or more, if required. Since the addition amount of the fluorescent brightening agents varies depending upon the thickness of the film to be formed, the properties of the fluorescent brightening agents, and the existence, properties and addition amount of an ultraviolet absorber, it cannot be determined unconditionally but those skilled in the art can easily determine. In general, the amount of from 0.1 to 10 mass % should be sufficient with the product having a thickness of 1 mm. The addition amount and the thickness of the material to which the fluorescent brightening agents are added are almost in the relationship of inverse proportion. For example, a molded product of a fluorescent lamp cover having a thickness of 1 mm can substantially cut off the rays of 410 nm or less with the addition amount of the compound represented by formula (II) of 0.21 mass %. Thus, light absorption characteristic at 410 nm according to the present invention depends upon the thickness of the medium and the fluorescent brightening agent and the amount of it.

The fluorescent lamp cover of the present invention and commercially available ultraviolet-absorbing adhesive films were stuck on a glass plate and the absorption spectra were measured in an ordinary method. The results obtained are shown in FIG. 1. The results show that the sample of the present invention is less in a yellow tint and highly transparent, although it absorbs rays as long as 410 nm as compared with the commercial samples.

The fluorescent brightening agents according to the present invention may be added to any of a hard coat layer, a support, a binder layer, and an adhesive layer in the ultraviolet-absorbing film. They may be used alone or two or more in combination. Since the addition amount of the fluorescent brightening agents to these layers varies depending upon the thickness of the hard coat layer, the support and the adhesive layer, the properties of the fluorescent brightening agents, and the existence, properties and addition amount of an ultraviolet absorber, it cannot be determined unconditionally but those skilled in the art can easily determine. In general, the amount of from 0.1 to 30 mass %, preferably from 4 to 15 mass %, should be sufficient with the adhesive layer having a thickness of 50 μm. The addition amount and the thickness of the material to which the fluorescent brightening agents are added are almost in the relationship of inverse proportion. For example, an adhesive layer having a thickness of 50 μm can substantially cut off the rays of 410 nm or less with the addition amount of the compound represented by formula (II) of 4 mass %.

Glass sputtering prevention function is regulated in JIS A5759.

Figure 2:
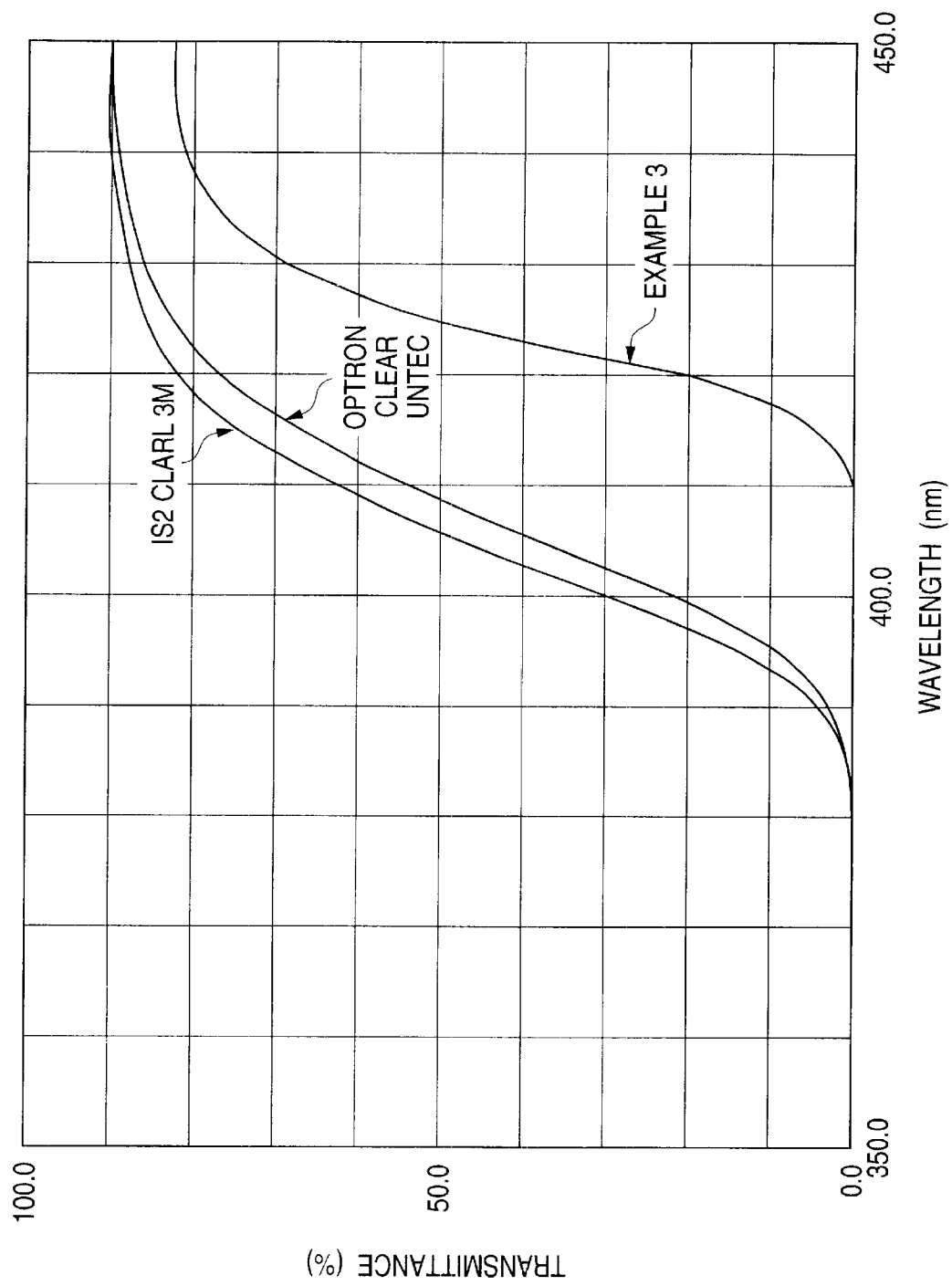
FIG. 2 is a graph showing the absorption spectra of ultraviolet rays in Example 3 of the present invention and commercially available products.

The film of the present invention and commercially available ultraviolet-absorbing adhesive films were stuck on a glass plate and the absorption spectra were measured with an ultraviolet/visible recording spectrophotometer manufactured by Shimadzu Corporation. The results obtained are shown in FIG. 2. The results show that the sample of the present invention is less in a yellow tint and highly transparent, although it absorbs rays as long as 410 nm as compared with the commercial samples.

As described above, in the fluorescent lamp cover and the ultraviolet-absorbing film of the present invention, the object can be achieved by adding a fluorescent brightening agent to a transparent resin. However, if there is uncertainty with the light fastness of a fluorescent brightening agent, or if a fluorescent brightening agent cannot sufficiently cut off the rays in short wavelength region, it is preferred to use an ultraviolet absorber in combination. The ultraviolet absorber is in general a compound having the properties of absorbing ultraviolet rays and converting the absorbed rays to heat. They can be classified roughly into benzotriazole-based, benzophenone-based, salicyclic acid-based and cyanoacrylate-based compounds. The effective absorption wavelength of the benzotriazole-series compounds is from about 270 to 380 nm, and the representative examples of the compounds include 2-(2'-hydroxy-5'-methylphenyl) benzotriazole, 2-(2'-hydroxy-5'-t-butylphenyl) benzotriazole, 2-(2'-hydroxy-3',5'-di-t-butylphenyl) benzotriazole, 2-(2'-hydroxy-3'-t-butyl-5'-methylphenyl)-5-chlorobenzotri azole, 2-(2'-hydroxy-3',5'-di-t-butylphenyl)-5-chlorobenzotriazole, 2-(2'-hydroxy-3',5'-di-t-amylphenyl) benzotriazole, and 2-(2'-hydroxy-4'-octoxyphenyl)-benzotriazole.

The effective absorption wavelength of the benzophenone-based compounds is from about 270 to 380 nm, and the representative examples of the compounds include 2,4-dihydroxybenzophenone, 2-hydroxy-4-methoxybenzophenone, 2-hydroxy-4-octoxybenzophenone, 2-hydroxy-5-dodecyloxybenzophenone, 2,2'-dihydroxy-4-methoxybenzophenone, 2,2'-dihydroxy-4,4'-dimethoxybenzophenone, and 2-hydroxy-4-methoxy-5-sulfobenzophenone.

The effective absorption wavelength of the salicyclic acid-based compounds is from about 290 to 330 nm, and the representative examples of the compounds include phenyl salicylate, p-t-butylphenyl salicylate, and p-octylphenyl salicylate.

The effective absorption wavelength of the cyanoacrylate-based compounds is from about 270 to 350 nm, and the representative examples of the compounds include 2-ethylhexyl-2-cyano-3,3-diphenyl acrylate and ethyl-2-cyano-3,3-diphenyl acrylate.

When a thermoplastic resin is melt-molded, since the problem of bleeding out of ultraviolet absorbers sometimes occurs, ultraviolet absorbers having a large molecular weight as dimerized via methylene such as Adekastab LA-31 are preferred. These ultraviolet absorbers may be used alone or in combination of two or more. Since the appropriate addition amount of these fluorescent brightening agents varies depending upon the thickness of the product to be formed and the properties of the fluorescent brightening agents, it cannot be determined unconditionally but those skilled in the art can easily determine. In general, the amount of from 0.1 to 30 mass % should be sufficient with the molded fluorescent lamp cover having a thickness of 1 mm.

In the case of an ultraviolet-absorbing layer, the amount in the adhesive layer having a thickness of 50 μm of from 0.1 to 30 mass %, preferably from 4 to 15 mass %, should be sufficient. The addition amount and the thickness of the material to which the fluorescent brightening agents are added are almost in the relationship of inverse proportion.

As described above, the use of a fluorescent brightening agent alone or the combined use with an ultraviolet absorber should be sufficient in practice, but when strictness is required, it is preferred that a white pigment having a high interrupting property, e.g., a small amount of titanium oxide (from 0.05 to 0.15 mass %), be added. When the appearance and tone are taken into consideration or according to taste, a trace amount (0.05% or less) of colorants maybe added. The addition amount and the thickness of the material to which the fluorescent brightening agents are added are almost in the relationship of inverse proportion.

The methods of adding and mixing the above components with transparent resins are not restricted. For example, methods of thoroughly mixing the powders, flakes or pellets of transparent thermoplastic resins with the above components and then melt-mixing by an extruder are preferably used. In transparent thermoplastic resins, methods of adding the above components to unhardened liquid state starting materials and thoroughly mixing and dispersing them are preferred. At this time, generally used additives, e.g., a thermal stabilizer, an antioxidant, a mold releasing agent, an antistatic agent, and a flame retarder may be added. Molding may be performed in ordinary methods. That is, in the case of thermoplastic resins, covered pipes can be produced by a melt-extrusion method, shrink tubes can be produced by stretching and quenching of the pipes obtained by melt-extrusion, and covers can be produced by injection molding, extrusion molding and, if necessary, vacuum molding. In the case of thermo-setting resins, cast molding is advantageous.

The fluorescent lamp cover according to the present invention generally comprises a transparent resin, a fluorescent brightening agent and an ultraviolet absorber. The thickness of the fluorescent lamp cover is preferably from 0.3 to 10 mm, more preferably from 0.5 to 3 mm, in the case of using thermoplastic resins, and preferably from 25 to 200 μm, more preferably from 50 to 100 μm, in the case of heat-shrinkable resins. In the case of cast molding, the thickness if from 0.1 to 50 mm, more preferably from 0.5 to 10 mm.

The ultraviolet-absorbing film of the present invention generally comprises a transparent support, an adhesive layer, a mold releasing paper, a hard coat layer and a binder layer. The thicknesses of these layers are generally as follows.

A transparent support: 25 to 100 μm

A binder layer: 10 to 50 μm

An adhesive layer: 10 to 100 μm

A mold releasing paper: 10 to 50 μm

A hard coat layer: 2 to 50 μm

As the adhesive components for use in the adhesive layer, highly transparent acrylate resins, natural rubber and styrene-butadiene resins can be exemplified. For example, as acrylate resins, commercially available products, such as Oribain BPS 1109, two-liquid type (trade name, manufactured by Toyo Ink Mfg. Co., Ltd.), Finetac TD-3208, two-liquid type (trade name, manufactured by Dainippon Chemicals and Ink Co., Ltd.), Nissetsu KP-41, one-liquid type (trade name, manufactured by Nippon Carbide Industrial Co., Ltd.) can be exemplified, but adhesives having novel compositions developed according to necessity can also be used.

It is preferred that the residual solvent be nothing but sometimes solvents remain in an amount of from 10 to 2,000 ppm in binders and films after adhesives are coated.

A mold releasing paper is to protect an adhesive layer during the time from coating until sticking on a windowpane, and a fluorine-contained resin and a silicone resin are coated on the surface of the side which is to be brought into contact with an adhesive layer for easy peeling.

The surface of a hard coat layer is subjected to hardening processing in molding so as not to be scratched by wiping off dirt, in such a degree as hardness 2H of the pencil.

As a transparent support, e.g., polyethylene terephthalate having a molecular weight of from 30,000 to 50,000, or a copolymer film containing polyethylene terephthalate as a main component may be used. Commercially available products which are highly transparent, e.g., Lumiler (manufactured by Toray Co., Ltd.) and Emblet (manufactured by Unitika Ltd.) are preferably used.

The binders for use in a binder layer, those described in the transparent resins for the fluorescent lamp cover can be exemplified.

EXAMPLES

The present invention will be illustrated in more detail with reference to examples below, but these are not to be construed as limiting the present invention.

Example 1

Pellets were prepared by adding the following composition to a methyl methacrylate copolymer, thoroughly mixing them and extruding by a kneading extruder.

| | |
|---|---|
| Compound represented by formula (1) | 0.21 mass % |
| Adekastab LA-31 (trade name manufactured by Asahi Denka Kogyo K.K.) | 0.11 mass % |

The thus-obtained pellets were extrusion molded by vacuum molding, thus a fluorescent lamp sleeve having a thickness of 1 mm and an outer diameter of 38 mm.

Example 2

Pellets were prepared in the same manner as in Example 1 by adding the following composition to a thermal polyethylene terephthalate for thermal shrinkage.

| | |
|---|---|
| Compound represented by formula (1) | 2.1 mass % |
| Adekastab LA-31 (trade name manufactured by Asahi Denka Kogyo K.K.) | 1.1 mass % |

The thus-obtained pellets were extrusion molded by melt extrusion, thus a tube for thermal shrinkage. The thickness of the tube was adjusted to 100 μm. This thermal shrinkable tube was covered over a commercially available broadband emission type and three-wavelength emission type white fluorescent lamp and laminated by heating at 120° C. for 1 minute.

Example 2'

A fluorescent lamp sleeve was prepared in the same manner as in Example 1 except that the methyl methacrylate polymer of Example 1 was replaced by an equimass of methyl methacrylate/styrene (60/40 mass %) copolymer.

Comparative Example

Pellets were prepared by adding the following composition to a methyl methacrylate copolymer, thoroughly mixing them and extruding by a kneading extruder.

| | |
|---|---|
| Comparative compound below | 0.50 mass % |
| Adekastab LA-31 (trade name manufactured by Asahi Denka Kogyo K.K.) | 0.11 mass % |

The thus-obtained pellets were extrusion molded by vacuum molding, thus a fluorescent lamp sleeve having a thickness of 1 mm and an outer diameter of 38 mm.

The above-prepared product and the tube in Example 2 (before covering) were subjected to exposure with Sunshine Weather Meter for 500 hours on the condition of no raining. The degree of discoloration was visually evaluated. The results obtained are shown in the following Table 1.

TABLE 1

| Evaluated Product | Discoloration after Exposure for 500 Hours |
|---|---|
| Molded product in Example 1 | No change was observed. |
| Tube in Example 2 | No change was observed. |
| Molded product in Comparative Example | Conspicuously yellowed. |
| Molded product in Example 2' | No change was observed. |

The absorption spectrum of the molded product in Example 1 was measured. As a result, it was found that the ultraviolet-absorbing film of the present invention is less in a yellow tint and highly transparent, although it absorbs rays as long as 410 nm as compared with the commercial samples, 3M ISCLARL (trade name) and OPTRON CLEAR (trade name, manufactured by Lintec Co.) (see FIG. 1). The tube and sleeve prepared in Examples 2 and 2' also showed the same result.

The ultraviolet-absorbing covers for a fluorescent lamp obtained according to the present invention are less in a yellow tint, highly transparent, and transmitted light is not colored, accordingly, when they are used in the products where there is fear of discoloration, such as the fluorescent lamps for show windows and show cases for displaying goods, the fluorescent lamps and front acrylate resin panels for automatic vending machine, photographs, photographs with a fluorescent lamp as a back light (e.g., G color, a product of Fuji Photo Film Co., Ltd.), and liquid crystal display, in addition to the lighting fixture for general housings and factories, they do not impair intrinsic natural colors of articles. Further, as the ultraviolet-absorbing fluorescent lamp covers according to the present invention can prevent leaking out of ultraviolet rays generated from lighting fixture such as fluorescent lamps, an incitement to flying insects can be hindered.

The object of the present invention is to interrupt ultraviolet rays generated from fluorescent lamps, but the present invention can also be applied to light sources similarly generating ultraviolet rays other than fluorescent lamps, e.g., lighting fixtures such as incandescent lamps, tungsten halogen lamps and mercury lamps.

Example 3

The resin, ultraviolet absorber and fluorescent brightening agent shown below were added to 50 ml of toluene and 50 ml of methyl ethyl ketone and dissolved at 40° C.

| | |
|---|---|
| Copolymer of methyl methacrylate/styrene (60/40 mass %) | 17.6 g |
| 2-(2'-Hydroxy-5'-t-butylphenyl)benzotriazole | 1.2 g |
| Fluorescent brightening agent (Compound (2)) | 1.2 g |

The mixed solution was coated on a PET film (trade name: Lumiler, thickness: 25 μm, visible ray transmittance: 95%, manufactured by Toray Industries Inc.) by means of a reverse coater, dried at 65° C. for 5 minutes, thereby a binder layer having a thickness of 25 μm was formed.

Example 4

One hundred (100) grams of acrylate resin (trade name: Acrytec, manufactured by Dainippon Chemicals and Ink Co., Ltd.) was added to 50 ml of toluene and 50 ml of methyl ethyl ketone and dissolved at 40° C. The thus-obtained solution was coated on the binder layer of the film prepared in Example 3 by means of a reverse coater, dried at 65° C. for 5 minutes, thereby an adhesive layer having a thickness of 50 μm was formed. A mold releasing paper is laminated on the adhesive layer to thereby obtain a transparent ultraviolet-absorbing adhesive sheet.

The ultraviolet-absorbing films obtained according to the present invention are less in a yellow tint, highly transparent, and transmitted light is not colored, therefore, when they are used in the products where there is fear of discoloration, such as the windowpane for show windows and show cases for displaying goods, the acrylate resin panels for automatic vending machine, photographs, photographs with a fluorescent lamp as a back light (e.g., G color, a product of Fuji Photo Film Co., Ltd.), color prints printed by ink jet printers, outdoor exhibits such as posters, and liquid crystal display, in addition to the windowpanes for general housings, factories and vehicles, they do not impair intrinsic natural colors of articles. Further, since the ultraviolet-absorbing films of the present invention can prevent leaking out of ultraviolet rays generated from lighting fixtures such as fluorescent lamps, incandescent lamps, tungsten halogen lamps and mercury lamps, an incitement to flying insects can be hindered.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth herein.

What is claimed is:

1. A fluorescent lamp cover, which comprises a transparent resin containing a fluorescent brightening agent so as to cut off 90% or more of the rays of 410 nm or less, wherein the fluorescent brightening agent is represented by the following formula (I):

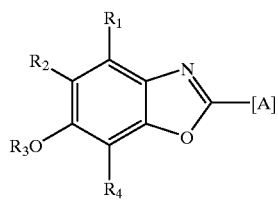

wherein $R_1$ and $R_4$ each independently represents a hydrogen atom, an alkyl group or an alkoxyl group; $R_2$ and $R_3$ each independently represents an alkyl group; and [A] represents a group selected from the following formulae (a) to (k):

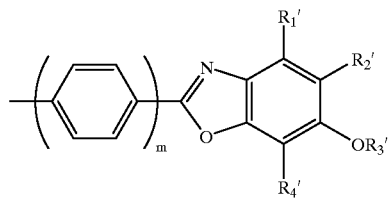

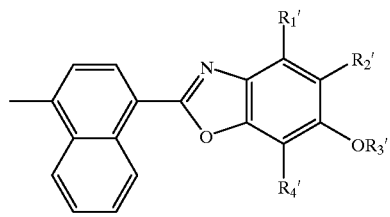

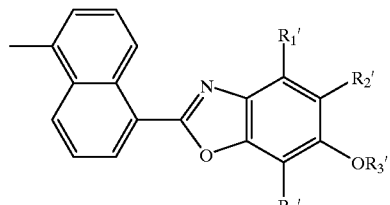

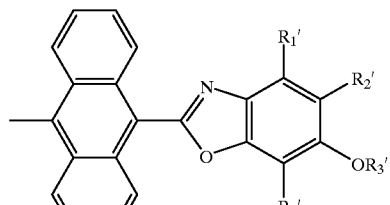

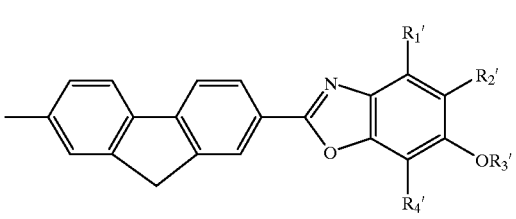

-continued

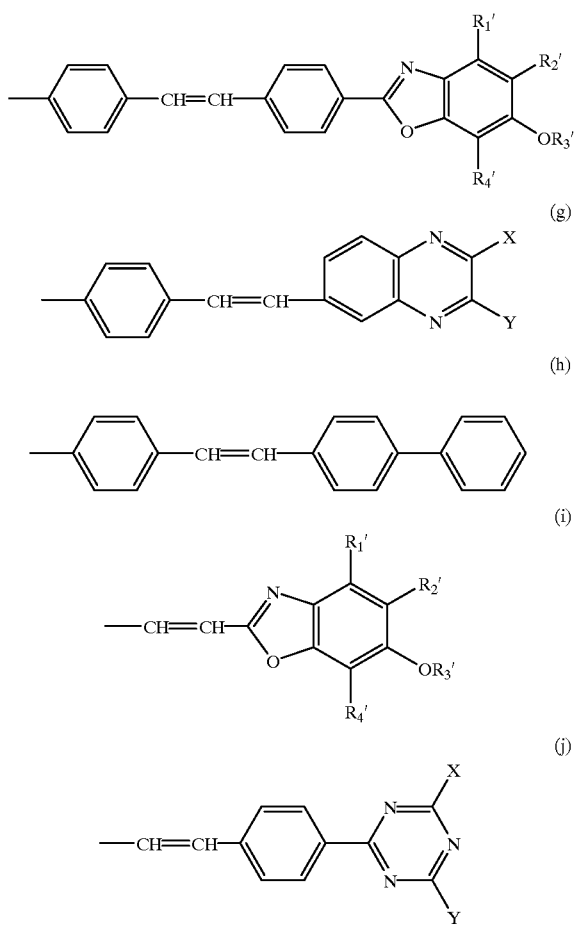

(f)

(g)

(h)

(i)

(j)

-continued

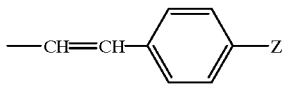

(k)

wherein in the above formulae, $R_1'$ and $R_4'$ have the same meaning as $R_1$ and $R_4$ respectively; $R_2'$ and $R_3'$ have the same meaning as $R_2$ and $R_3$ respectively; m represents an integer of from 1 to 5; X and Y each represents an alkyl group, an aryl group, an alkoxyl group, an alkylamino group, an arylamino group, an amino group or a hydroxyl group; and Z represents an alkyl group, an aryl group, a cyano group, or an alkoxycarbonyl group.

2. The fluorescent lamp cover as claimed in claim 1, wherein the compound represented by formula (I) is a compound represented by the following formula (II):

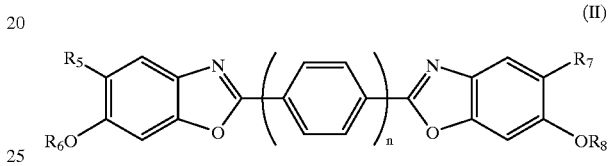

(II)

wherein $R_5$ and $R_7$ have the same meaning as $R_2$; $R_6$ and $R_8$ have the same meaning as $R_3$; and n represents an integer of 1 or 2.

3. The fluorescent lamp cover as claimed in claim 1, wherein the transparent resin is a copolymer of methyl methacrylate and styrene, and the ratio of methyl methacrylate to styrene is from 1/99 mass % to 99/1 mass %.

4. A lighting fixture which comprises a broadband emission type or three-wavelength emission type fluorescent lamp covered with a cover claimed in claim 1 so as to cut off the rays of 410 nm or less.

* * * * *